United States Patent [19]

Banerjee et al.

[11] Patent Number: 5,310,765
[45] Date of Patent: May 10, 1994

[54] PROCESS FOR HYDROLYSIS OF ION EXCHANGE MEMBRANES

[75] Inventors: Shoibal Banerjee, Newark, Del.; Walther G. Grot, Chadds Ford, Pa.

[73] Assignee: E. I. Du Pont de Nemours and Company, Wilmington, Del.

[21] Appl. No.: 25,921

[22] Filed: Mar. 3, 1993

[51] Int. Cl.$^5$ ................................ C08J 5/20
[52] U.S. Cl. ...................... 521/33; 521/31; 204/296; 525/326.2
[58] Field of Search ............ 204/296; 521/27, 30, 521/33, 31; 525/326.2

[56] References Cited

U.S. PATENT DOCUMENTS

| | | | |
|---|---|---|---|
| 4,376,030 | 3/1983 | Ezzell et al. | 204/296 |
| 4,595,476 | 6/1986 | Bissot | 204/252 |
| 4,900,420 | 2/1990 | Kurauchi et al. | 204/296 |
| 4,904,701 | 2/1990 | Hiyoshi et al. | 521/32 |
| 4,954,388 | 9/1990 | Mallouk et al. | 204/295 |
| 5,066,682 | 11/1991 | Miyazaki et al. | 521/27 |
| 5,164,060 | 11/1992 | Eisman et al. | 204/282 |

Primary Examiner—Kathryn Gorgos
Attorney, Agent, or Firm—Cary A. Levitt

[57] ABSTRACT

A process is provided for hydrolysis of fluorinated ion exchange membranes. The membrane is contacted with an aqueous solution containing a hydrocarbon having ether, epoxy or ketone linkages and an alcohol group, preferably 1-methoxy 2-propanol, for a period of time sufficient to perform the hydrolysis of the precursor groups. The membrane is useful in a fuel cell or in an electrolytic cell, particularly a chloralkali cell.

7 Claims, No Drawings

PROCESS FOR HYDROLYSIS OF ION EXCHANGE MEMBRANES

FIELD OF THE INVENTION

The present invention relates to a process for preparing an ion exchange membrane which can advantageously be employed to separate the anode and cathode compartments of a fuel cell or an electrolytic cell, especially a chloralkali cell. More particularly, the present invention is concerned with a process for preparing a fluorinated ion exchange membrane in which the membrane is contacted with an aqueous solution containing a compound having an ether, epoxy or ketone linkage and an alcohol group, which is non-solid at room temperature, preferably 1-methoxy 2-propanol, for a period of time sufficient to hydrolyze the perfluorinated precursor groups.

BACKGROUND OF THE INVENTION

The use of a fluorinated ion exchange membrane having carboxylate and/or sulfonate ion exchange groups, as a membrane for separating the anode and cathode compartments of a fuel cell or an electrolytic cell, especially a chloralkali electrolytic cell, is well known. In an electrolytic cell, it is desired that the ion exchange membrane exhibit low cell voltage and high current efficiency, thereby enabling the electrolytic cell to be stably operated with low electric power consumption. In a fuel cell, it is desired that the ion exchange membrane exhibit high ionic conductivity, thereby enabling the fuel cell to be stably operated with high electric power output.

The fluorinated ion exchange membrane having carboxylate and/or sulfonate ion exchange groups is conventionally manufactured by first molding a fluorinated polymer having ion exchange precursor groups and having thermoplastic properties into a film, and then hydrolyzing the ion exchange precursor groups to thereby form carboxylate and/or sulfonate ion exchange groups. The customary method for hydrolyzing the ion exchange precursor groups comprises contacting the precursor groups with an aqueous solution of an alkali metal hydroxide or with a mixture of an aqueous solution of an alkali metal hydroxide and an organic solvent selected from an alcohol such as methanol, ethanol or propanol or a water soluble organic solvent such as dimethyl sulfoxide. The alcohol or the water soluble organic solvent is added in order to increase the hydrolysis rate of the ion exchange precursor groups.

It is known that an ion exchange membrane is likely to swell, thereby forming wrinkles on the surface of the membrane, when it comes into contact with a cell electrolyte. This wrinkle formation is likely to be accompanied by problems, such as increase in voltage of an electrolytic cell attributed to the retention of evolved gas and/or electrolyte by the wrinkles, pinhole formation, and membrane tearing attributed to the rubbing of the wrinkled membrane against an electrode. To cope with these problems, proposals have been made in which an ion exchange membrane is pre-swollen prior to installation in the cell by immersing the membrane in a specific organic solvent or an aqueous solution of an organic solvent. For example, U.S. Pat. No. 4,595,476 discloses a process for pre-swelling an ion exchange membrane with an aqueous solution containing an organic solvent such as diethylene glycol and triethylene glycol. Further, U.S. Pat. No. 4,376,030 discloses a process for pre-swelling an ion exchange membrane in which the membrane is pre-swollen at a temperature of from 20° to 80° C. using an aqueous solution containing an amine selected from primary, secondary and tertiary amines, most preferably triethanolamine, in an amount of from 2 to 60% by weight.

However, in these prior art hydrolysis processes, two separate steps, i.e. a hydrolysis step and a pre-swelling step, are inevitably involved. Consequently, all of these processes have a drawback in that a complicated procedure is necessary.

U.S. Pat. No. 4,904,701 discloses a hydrolysis process in which the membrane is hydrolyzed with an aqueous solution of at least one basic organic compound for a period of time sufficient to hydrolyze the precursor ion exchange groups. The basic organic compounds include basic nitrogen compounds such as an amine or an imine, preferably triethanolamine or diethanolamine. However, the basic organic compound may not completely hydrolyze the precursor ion exchange groups or the hydrolysis process may take a long time. In addition, the basic organic compound may adversely interact with the ion exchange change groups, thereby decreasing the stability and efficiency of the membrane. In addition, amines such as triethanolamine may be flammable or explosion hazards.

U.S. Pat. No. 5,066,682 discloses a hydrolysis process in which the membrane is hydrolyzed with an alkali aqueous solution containing dimethyl sulfoxide, methanol, ethanol or propanol. However, methanol, ethanol and propanol are difficult to handle due to flammability and explosion hazards. In addition, high concentrations, up to 30% by weight, may be necessary for the additive to facilitate hydrolysis. Dimethyl sulfoxide may be toxic and also causes noxious odors. Dimethyl sulfoxide may also contribute to poisoning of the electrode catalyst in an electrochemical cell, particularly a cell having a unified membrane and electrode structure. Moreover, dimethyl sulfoxide may be difficult to dispose of, because it may cause noxious odors during incineration or in an anaerobic treatment facility.

Therefore, a hydrolysis process for ion exchange membranes is needed in which the membrane may be hydrolyzed in a quick, simple manner, the membrane is dimensionally stable and is pre-swollen in order to avoid wrinkles and pinholes, the hydrolysis agent does not adversely interact with the membrane's ion exchange groups, the hydrolysis agent is not highly flammable, does not poison the electrode catalyst and may be readily disposed of.

SUMMARY OF THE INVENTION

The hydrolysis of the ion exchange precursor groups of a fluorinated resin by the use of an alkaline or acidic aqueous solution containing an organic compound having an ether, epoxy or ketone linkage and an alcohol group, which is non-solid at processing temperatures, preferably 1-methoxy 2-propanol, eliminates the need for a complicated pre-swelling step, provides an ion exchange membrane having excellent dimensional stability and performance stability. The hydrolysis agent does not adversely interact with the ion exchange groups, is not highly flammable, does not poison the electrode catalyst and may be readily disposed of. The hydrolysis agent may advantageously be stored and used without noxious odors.

DETAILED DESCRIPTION OF THE INVENTION

According to the process of the present invention, a membrane of a fluorinated resin having ion exchange precursor groups, i.e., groups of —$SO_2X$, $C\equiv N$ and/or COX, wherein X is a halogen atom or —OR where R is an alkyl group having 1 to 6 carbon atoms, preferably 1 carbon atom, is contacted with an aqueous solution for a period of time sufficient to hydrolyze the precursor groups of the formula —$SO_2X$ and/or the precursor groups of the formula $C\equiv N$ and/or COX to sulfonate groups and/or carboxylate groups respectively. The aqueous solution contains a hydrolysis agent which is a hydrocarbon having an ether, epoxy or ketone linkage and an alcohol group, which is non-solid at processing temperatures. The preferred hydrolysis agent is 1-methoxy 2-propanol ("MOP"). Other hydrolysis agent's include: 1-ethoxy 2-propanol; 1-methoxy 2-methyl 2-propanol; 1-propoxy 2-propanol; 1-isopropoxy 2-propanol; 2-phenoxy 1-propanol; 2-ethoxy 1-propanol; 2,3-ethoxy 1-propanol; 2-methoxy 1-propanol; 1-butoxy 2-propanol; or mixtures thereof. In the foregoing examples, the propanol constituent may be substituted with other alcohols, for example, ethanol or butanol.

The hydrolysis agent is particularly useful because it advantageously facilitates hydrolysis of the precursor ion exchange group. Such compounds are relatively inexpensive and may also be used in the processing of membrane and electrode structures for fuel cells. Moreover, the hydrolysis agent does not significantly interact with the functional groups of the polymer which interaction could impair or reduce ionic conductivity. In addition, the hydrolysis agent may act as a viscosity regulating agent or a wetting agent which facilitates the hydrolysis of the precursor ion exchange groups. It is believed that the alcohol group on the hydrocarbon compound advantageously facilitates swelling of the membrane to avoid wrinkles or pinholes during operation.

The ion exchange membrane as obtained according to the process of the present invention also has excellent dimensional stability and also excellent performance stability during use in an electrolytic cell or fuel cell.

In the process of the present invention, the ratio of the amount of the solution to that of the membrane of a fluorinated ion exchange resin is not critical, as long as the amount of the aqueous solution is sufficient to hydrolyze the ion exchange precursor groups. Because this hydrolysis is generally conducted by immersing the membrane in the aqueous solution, it is generally preferred that the amount of the aqueous solution be sufficient to immerse the membrane therein. Although any excess amount of the aqueous solution may be employed without having any adverse effect, no further advantage is obtained thereby, especially from the economical point of view.

The aqueous solution should preferably contain water in an amount sufficient to perform the hydrolysis of the ion exchange precursor groups. The amount of water sufficient for the hydrolysis of the ion exchange precursor groups is the amount, in terms of moles, equal to or more than the total amount of the precursor groups. An appropriate water content of the aqueous solution is chosen taking into account the ratio of the weight of the solution to that of a membrane of a fluorinated ion exchange resin having pendant ion exchange precursor groups.

The water content of the aqueous solution is preferably in the range of from 50 to 95% by volume, based on the volume of the solution. When the water content is in this range, the rate of hydrolysis is sufficiently high and the membrane obtained by the process of the present invention has an effect of exhibiting low membrane resistance when used in an electrolytic cell or a fuel cell. In addition, when —X is a halogen, the water content of the membrane is preferably sufficient to keep the alkali metal halide in solution, in order to prevent the alkali metal halide from precipitating inside the membrane.

The aqueous solution preferably contains an alkali metal hydroxide. The alkali metal hydroxide may be lithium hydroxide, sodium hydroxide and potassium hydroxide or mixtures thereof. The solution may also contain an alkali metal salt such as sodium chloride, potassium chloride, sodium bromide, potassium bromide and lithium chloride or mixtures thereof. The type and concentration of the alkali metal hydroxide and alkali metal salt added affect the type and proportion of the counter ions for the ion exchange groups formed after hydrolysis. Further, the type and proportion of the counter ions, in turn, affect the properties of the ion exchange membrane. Therefore, by controlling the type and concentration of the alkali metal hydroxide and alkali metal salt to be added, the properties of the membrane can advantageously be controlled so that the effects of the present invention are fully exhibited. In addition, for some carboxylate groups, an acidic medium may be used to hydrolyze the ion exchange groups.

In the process of the present invention, the hydrolysis of ion exchange precursor groups is generally carried out at a temperature of 50° to 95° C., preferably 65° to 85° C. When the hydrolysis is conducted at a temperature of lower than 50° C., not only is a prolonged period of time needed to complete the hydrolysis, but also the ultimate ion exchange membrane obtained may not exhibit a desirable effect of reducing the cell voltage. On the other hand, when the hydrolysis is conducted at a temperature of higher than 95° C., the rate of evaporation of the hydrolysis solution becomes prohibitively high. In addition, the ion exchange membrane may have decreased mechanical strength. In addition, the upper hydrolysis temperature may be limited by the boiling point of the hydrolysis agent.

The period of time for which the hydrolysis of ion exchange precursor groups is to be effected varies depending on the type of the compound, the composition of the aqueous solution and the temperature at which the hydrolysis is effected. However, it is generally in the range of from 0.1 to 5 hours.

The membrane to be treated in the present invention is fluorinated, which means that at least 90%, preferably at least 95%, and most preferably all of the atoms attached to the carbons are F atoms or side-chain ether groups, which may contain functional groups hydrolyzable to salts. The non-fluorine atoms, if used, may be H, Cl, or Br. The polymers also have pendant sulfonyl or carboxyl groups. Preferably, the membrane used in chloralkali cells consists of at least two layers, at least the one layer in contact with the anolyte having pendant sulfonyl groups.

The sulfonyl polymers may be made are fluorinated polymers with side chains containing the group —$CF_2CFR'SO_2X$, wherein R' is F, Cl, $CF_2Cl$ or a $C_1$ to $C_{10}$ perfluoroalkyl radical, and X is F or Cl, preferably F. Ordinarily, the side chains will contain —$OCF_2CF_2CF_2SO_2X$ or —$OCF_2CF_2SO_2F$ groups, preferably the latter. The perfluorinated polymers are preferred.

Polymers containing the side chain

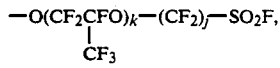

where k is 0 or 1 and j is 2, 3, 4, or 5, may be used. These are described in U.S. Pat. No. 4,329,435 (Kimoto et al., Asahi Glass). Polymers containing the side chain —$CF_2CF_2SO_2X$ are described in U.S. Pat. No. 3,718,627 (Grot, Du Pont). These sulfonyl polymers are not limiting and others are known to those skilled in the art.

Preferred polymers contain the side chain —$(OCF_2CFY)_r$—$OCF_2CFR'SO_2X$, where R', Y, and X are as defined above; and r is 0, 1, 2, or 3. Some of those polymers are described in U.S. Pat. No. 3,282,875 (Connolly et al., Du Pont). Especially preferred are copolymers containing the side chain

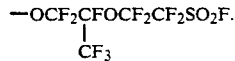

The salt-form carboxylic polymers have a fluorinated hydrocarbon backbone chain to which are attached side chains carrying, before hydrolysis to the salt form, certain functional groups hydrolyzable in an alkaline medium to carboxylate groups, such as nitrile or ester groups. Those polymers include, e.g., those containing the —$(OCF_2CFY)_n$—O—$CF_2$—$CF_2$—W side chains, where Y is F or $CF_3$; n is 0, 1, or 2; and W is COOR or —CN, where R is lower alkyl. Such polymers are described in U.S. Pat. No. 4,138,426 (England, Du Pont). Among these polymers, those with n=1 and Y=$CF_3$ are preferred. These carboxylic polymers are not limiting and others are known to those skilled in the art.

The copolymers should preferably be of high enough molecular weight to produce films which are self-supporting in both their melt-fabricable (precursor) form and in the hydrolyzed ion exchange form.

A membrane having at least one layer of a copolymer having sulfonyl groups in melt-fabricable form and a layer of a copolymer having carboxyl group in melt-fabricable form, such as made by coextrusion, can be used in the process of the present invention; or can be used as one of the component films in making the membrane be used in the process of the present invention. Such a laminated structure will be occasionally referred to herein as a bimembrane. Bimembranes are well known in the art.

The membrane used in this invention may also comprise three layers for example:

a) on the catholyte side, a carboxylate layer of a 5–50 micrometer thickness, preferably 20–40 micrometers, with an equivalent weight suitable to provide a water transport of 3.0–4.0 moles of water per gram-atom of Na, b) in the middle, an optional carboxylate layer with a lower equivalent weight and a thickness in the same range as that of (a), and c) on the anolyte side, a sulfonate layer of a 50–250 micrometer thickness, preferably 75–100 micrometers.

Membranes usually have an overall thickness of 50–300 micrometers, especially 125–200 micrometers.

The customary way to specify the structural composition of films or membranes in this field is to specify the polymer composition from which the membrane is fabricated, ion-exchange capacity or equivalent weight, and thickness of the polymer films in melt-fabricable form. This is done because the measured thickness varies depending on whether the membrane is dry or swollen with water or an electrolyte, and even on the ionic species and ionic strength of the electrolyte, even though the amount of polymer remains constant.

The equivalent weight of the polymer should be low enough to give low membrane resistance, but not so low as to give a membrane which is too soft or sticky when wet for convenient handling and installation in a cell. In the case where the side chain is the salt of —O—$CF_2$—$CF(CF_3)$—O—$CF_2$—$CF_2$—$SO_3H$, the equivalent weight is customarily about 800–1500, preferably 900–1300, and most preferably 900–1100. The equivalent weight of the sulfonate layer is calculated for the —$SO_3H$ form.

The membrane may be unreinforced film or bifilm, but for dimensional stability and greater notched tear resistance, it is common to use a reinforcing material. It is customary to use a fabric made of a fluorocarbon resin such as polytetrafluoroethylene or a melt-processable copolymer of tetrafluoroethylene with hexafluoropropylene or with perfluoro(propyl vinyl ether). These may be woven into fabric using various weaves, such as the plain weave, basket weave, leno weave, or others. Relatively open weaves are preferred because the electric resistance is lower. A porous sheet may be used as a support. Other perhalogenated polymers such as polychlorotrifluoroethylene may also be used, but perfluorinated supports have the best resistance to heat and chemicals. The fibers used in the support fabrics may be monofilaments or multifilament yarns. They may be of ordinary round cross-section or may have specialized cross-sections. Oblong or rectangular cross-sections, if suitably oriented to the membrane, make it possible to get more reinforcing action with a thinner overall membrane. It may be desirable to use sacrificial fibers such as rayon, paper, or polyester, along with the fluorocarbon fibers, as described in U.S. Pat. No. 4,437,951 (Bissot et al., Du Pont). The fabric employed may be calendared before lamination to reduce its thickness. In a bimembrane, the fabric may be in the sulfonate or carboxylate layer, or in both, but is more often in the sulfonate layer, which is usually thicker. In place of fabric, fibrils can be used.

Membranes may optionally be swelled with swelling agents or polar solvents (such as lower alcohols or esters, tetrahydrofuran, or chloroform) and then dried, preferably between flat plates, to improve their performance in an electrolytic cell or a fuel cell. Before mounting in commercial cell support frames, which may be 1–5 meters on a side in an electrolytic cell, the membrane can be swelled so that it will not wrinkle after it is clamped in the frame and exposed to electrolytic fluids. Among the swelling agents that can be used are water, brine, sodium bicarbonate solution, caustic, lower alcohols, glycols, or mixtures thereof. See, for example, U.S. Pat. No. 4,595,476 (Bissot, Du Pont).

The process of the present invention is very simple as compared to the conventional processes. In addition, the ion exchange membrane prepared by the process of the present invention has good dimensional stability and stable electrolytic performance.

EXAMPLES

Example 1

A reinforced bilayer fluorinated ion exchange membrane (commercially available from E. I. du Pont de Nemours and Company as NAFION® N90209) was hydrolyzed. The membrane comprises a 1.5 mil thick carboxylic polymer layer having a nominal equivalent weight of 1050 and a 4 mil thick sulfonyl polymer layer having a nominal equivalent weight of 1080. The membrane is reinforced with T924G cloth, a polytetrafluoroethylene cloth sold by Prodesco, Inc.

The membrane was hydrolyzed in a solution of 79% water, 6% potassium hydroxide and 15% MOP for one hour at 85° C. The membrane is then installed in a laboratory electrolysis cell with an effective membrane diameter of about 7.5 cm, using a mild steel cathode, an anode of titanium activated with a coating containing ruthenium oxide, and the membrane is urged against the anode by catholyte head. Purified saturated NaCl is used as anolyte. Electrolysis is carried out conventionally at 90° C. and 3.1 kA/m² current density to make 32 wt. % NaOH. The operational properties of the electrolytic cell are shown in Table 1.

TABLE 1

| Days on Line | Volts | NaOH Wt. % | CE % | Power Consumption (kWH/MT) |
|---|---|---|---|---|
| 1 | 3.377 | 29.88 | 93.48 | 2420.5 |
| 2 | 3.426 | 32.18 | 95.19 | 2411.5 |
| 5 | 3.423 | 32.28 | 96.32 | 2381.1 |
| 6 | 3.423 | 32.15 | 96.57 | 2374.9 |
| 7 | 3.425 | 32.02 | 96.55 | 2376.8 |

Comparative Example

The membrane of Example 1 was hydrolyzed in a solution of 56% water, 30% dimethyl sulfoxide and 14% potassium hydroxide for one hour at 85° C. The membrane was installed in the laboratory electrolysis cell of Example 1 and operated at the same conditions as those in Example 1. The operational properties of the electrolytic cell are shown in Table 2.

TABLE 2

| Days on Line | Volts | NaOH Wt. % | CE % | Power Consumption (kWH/MT) |
|---|---|---|---|---|
| 1 | 3.466 | 29.14 | 94.48 | 2458.0 |
| 2 | 3.518 | 31.40 | 95.19 | 2476.2 |
| 5 | 3.517 | 32.13 | 96.32 | 2446.5 |
| 6 | 3.518 | 32.35 | 96.73 | 2436.8 |
| 7 | 3.523 | 32.38 | 96.98 | 2434.0 |

What is claimed is:

1. A process for hydrolyzing a fluorinated ion exchange membrane having sulfonyl or carboxyl precursor groups comprising contacting said membrane with an aqueous solution comprising of at least one compound having an ether or epoxy; linkage and an alcohol group for a period of time to hydrolyze the sulfonyl precursor groups or the carboxyl precursor groups or both to sulfonate groups and carboxylate groups, respectively.

2. The process of claim 1 wherein the compound is selected from the group consisting of: 1-ethoxy 2-propanol; 1-methoxy 2-methyl 2-propanol; 1-propoxy 2-propanol; 1-isopropoxy 2-propanol; 2-phenoxy 1-propanol; 2-ethoxy 1-propanol; 2,3-ethoxy 1-propanol; 2-methoxy 1-propanol; 1-butoxy 2-propanol; and mixtures thereof.

3. The process of claim 1, wherein said membrane is contacted with the aqueous solution at a temperature of from about 25° to about 150° C.

4. The process of claim 1, wherein said membrane is contacted with the aqueous solution at a temperature of from about 60° to 100° C.

5. The process of claim 4, wherein said compound is 1-methoxy 2-propanol.

6. The process of claim 1 wherein the membrane is contacted with the aqueous solution for about 10 minutes to about 24 hours.

7. The process of claim 1 wherein the aqueous solution further comprises an alkali metal hydroxide.

* * * * *